No. 680,992. Patented Aug. 20, 1901.
J. DELATTRE.
APPARATUS FOR PURIFYING WATER.
(Application filed June 20, 1900.)
(No Model.)
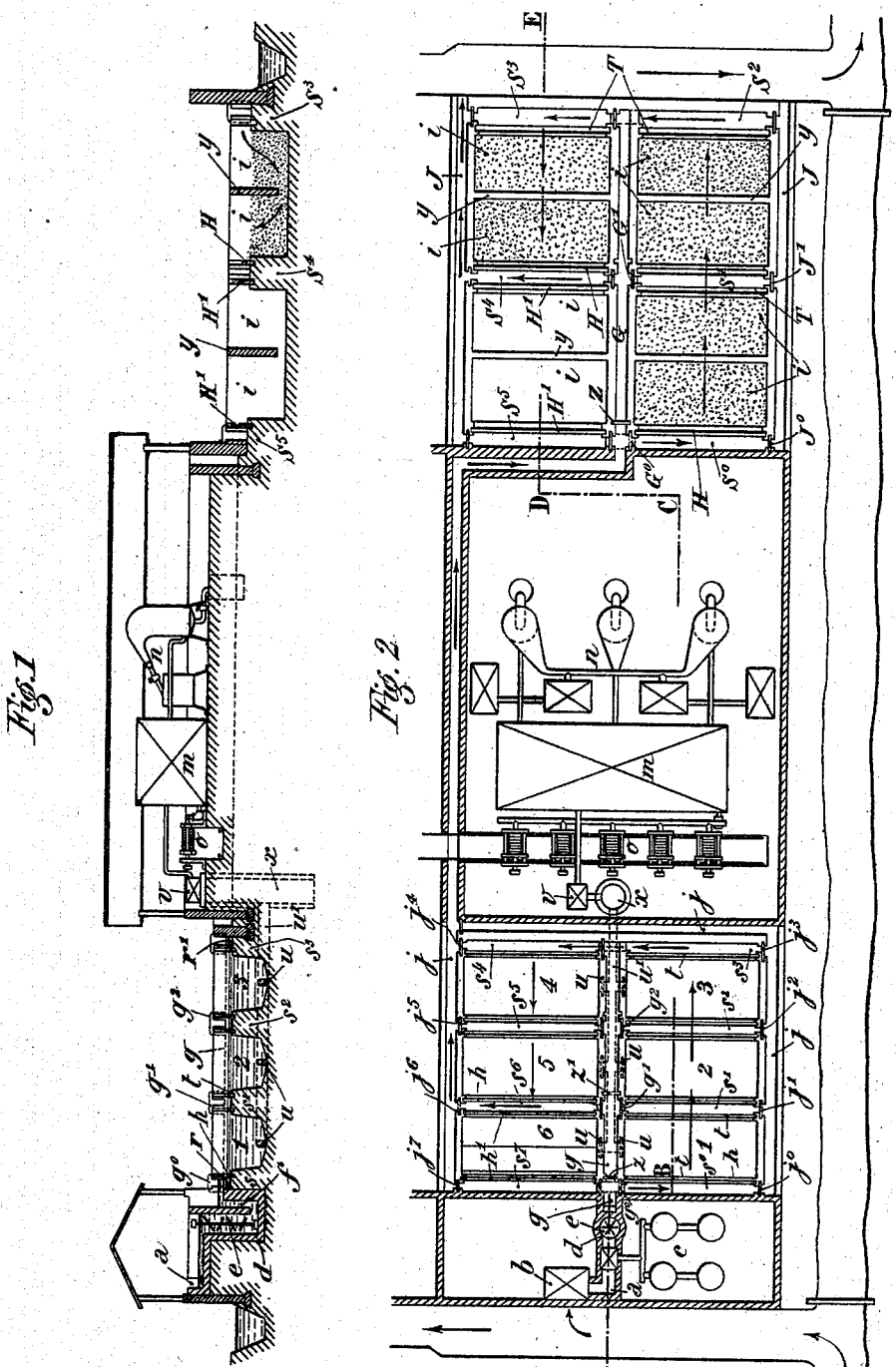
Witnesses:
Henry Thieme,
George Barry Jr.
Inventor:
Jules Delattre
by attorneys
Brown & Seward

UNITED STATES PATENT OFFICE.

JULES DELATTRE, OF DORIGNIES-FLERS, FRANCE.

APPARATUS FOR PURIFYING WATER.

SPECIFICATION forming part of Letters Patent No. 680,992, dated August 20, 1901.

Application filed June 20, 1900. Serial No. 20,937. (No model.)

*To all whom it may concern:*

Be it known that I, JULES DELATTRE, engineer, a citizen of the Republic of France, and a resident of Dorignies-Flers, (Nord,) France, have invented new and useful Improvements in Apparatus for Purifying Waste Waters, of which the following is a specification.

In my previous United States patent, No. 636,497, dated November 7, 1899, I have described and claimed an apparatus for purifying impure waters containing greasy matter which comprises as essential parts a raising-pump carrying the waters into a channel above it, where they are mixed with sulfuric acid or some similar reagent, a series of settling-tanks for the reception of the deposits and precipitates and the decantation, a filter placed at the outlet of the settling-tank, which is for the time being the last of the series, a channel where the waters issuing from the settling-tanks receive a supply of milk of lime, a mechanical agitator for insuring the thorough intermixture of the lime with the water, a series of neutralizing-tanks, and an extracting-battery for the decreasing of the fatty matters deposited after the acid treatment. I will now state that if, as I have indicated in said patent, the sulfuric acid may be substituted by other equivalent agents—that is to say, reagents suitable to produce the precipitation of the dirty fatty matters—such, for example, as ferric sulfate—the treatment with lime and the apparatus for such treatment may be omitted; but then it becomes necessary to perfectly filter the waters at their exit from the series of settling-tanks, and for that purpose the small filter shown and described in said patent is not sufficient. For that reason I have replaced the said filter by a series of special circulation-filters, taking the place of a second series of settling-tanks, (termed in the said patent "neutralizing-tanks,") thereby greatly simplifying the plant.

The accompanying drawings represent an apparatus embodying the present improvement.

Figure 1 represents a vertical section of the apparatus in the broken line A B C D E of Fig. 2, the latter figure representing a plan of the apparatus.

In this apparatus, as in that which is the subject of the aforesaid patent, the waters to be purified are sent by a pump $b$ into an upper conduit $a$, where they receive the addition of the reagent. Afterward to complete the mixture the water arrives from above in a cylindrical reservoir $d$, wherein it is subjected to the action of a rotary agitator $e$. It passes out from the reservoir at the bottom and rises in a vertical conduit, whence it overflows into a channel $g$. From this channel the water passes into the settling-tanks 1 2 3 4 5 6, in which it is decanted. The water, with the added reagent, is admitted into the first settling-tank 1 as a sheet, which overflows along the total width of the tank. Owing to the considerable width of the sheet of water, the speed is very slow, so that the deposit is left for the greater part in the first tank. The water then overflows into the next tank 2, and so on, issuing from the last tank 6 nearly clear.

The working of the tanks is methodical—that is to say, each of them serves successively as a first or receiving tank for the water. For this purpose the tanks are arranged in the following manner, viz: in two rows, which are separated by a wall, above which is formed the channel $g$. A removable gate $z$, capable of being placed in different positions in the channel, permits of the arrival of the water farther or not so far along this channel.

In each row the tanks are separated by walls $s^0$ $s'$ $s^2$, which are not so high as the channel $g$ and on which distribution-gutters are formed by means of movable planks $h$ $h'$, received in grooves $f$, formed in the tops of the said walls. The gutters thus formed may be put in communication with the feeding-channel $g$ by opening the gates $g^0$ $g'$ $g^2$, which are inserted into the sides of this channel in front of the walls $s^0$ $s'$ $s^2$. The said gutters may be put in communication with the exit-channel $j$ by opening the gates $j^0$ $j'$ $j^2$, inserted into the lateral walls of the rows of tanks. In the wall separating the two rows of tanks at the level of the reservoir an evacuation-conduit $u'$ is formed, through which the dirty fatty matters or sludge deposited in any one of the tanks flow into a pit $x$ when the corresponding gate $u$ is opened. Tubular conduits $r$ $r'$, passing under the channel $g$, form communication between the tops of the end walls $s^0$ $s^3$ of one of the rows and the tops of the end walls $s^7$ $s^4$ of the other row. The planks $h$ have a height a little less than the planks $h'$. If then a plank $h$ is put in one of the grooves and a plank $h'$ in another groove of one of the separation-walls of the tanks and if the water is allowed to arrive from the channel $g$ between these planks, the water will flow over the lower plank into the tank on the same side; but it will not flow into the tank on the side of the higher plank, because it cannot rise above the upper edge of that plank.

In the drawings the gate $g^0$ is opened. A low plank is placed in the groove $t$ of the wall $s^0$. Another low plank $h$ is placed in the groove of the neighboring wall $s^6$ of the tank 5, while high planks $h'$ are placed in the grooves of the walls $s^6$ and $s^7$ of the two sides of the tank 6. Finally the gate $j^6$ is opened. It results that the water coming from the channel $g$ flows into the gutter formed on the wall $s^0$, passes over the plank $h$ into the tank 1, fills this tank, passes thence from the wall into the tank 2, and continues thus from tank to tank until it meets the plank $h$ of the wall $s^6$. It passes over this plank and flows through $j^6$ into the conduit $j$. At the same time the gate $u$ of the tank 6 is opened, and this tank is being emptied. When it is empty, its gate $u$ is to be reclosed. When the tank 1 is full of sludge, the gates $g^0$ and $j^6$ are closed, the planks $h$ $h'$ are withdrawn, a high plank $h'$ is put in the groove of the wall $s^0$, a similar plank in the groove on the left of the wall $s'$, a low plank $h$ at the right of the same wall, and a second low plank $h$ in the groove of the wall $s^7$. The gate $z$ is replaced in $z'$, and the gates $g'$ and $g^7$ are opened; also, the gate $u$ of the tank 1. The water then passes from $g$ by $g'$, $s'$, 2, $s^2$, 3, $s^3$, $r'$, $s^4$, 4, $s^5$, 5, $s^6$, 6, $s^7$, $j^7$, and $j$. At the same time 1 is emptied. When 2 is full of sludge, the position of the planks and the gates is changed again in such manner that 2 will be emptying while the water to be purified passes into 3 4 5 6 1, and so on in the regular order. From the conduit $j$ the waters pass on to the filters $i$, wherein the filtration is performed through beds of sand, charcoal, coke, or other suitable matters. The water is then found in such a state that even fish may live and flourish in it. It may then afterward be sent into a river.

The arrangement of the filters $i$ is analogous to that of the settling-tanks 1 2 3 4 5 6 in that it comprises a feeding-channel G, with gates Z $G^0$ G', walls of separation $S^0$ S' $S^2$ $S^3$, with grooves T, movable planks H H', exit-gates $J^0$ J', and an evacuation-conduit J, all disposed and operating in the same manner as the parts designated by the corresponding small letters for the settling-tanks. There exists, however, a difference between the filtering-tanks and the settling-tanks, which is that the former are divided into two parts by a transverse partition $y$, which extends not quite to the bottom in such manner that the water descends into the first compartment to ascend through the second, as is shown clearly by the arrows in Fig. 1. It may be seen that with this arrangement of filters the filtration is methodical—that is to say, that the water coming from the settling-tanks passes first through a filtering-bed already charged with impurities and that it passes lastly through an absolutely new filtering-bed.

As to the sludges received in the pit $x$, they are sent by a pump $v$ into an extracting apparatus $m$. They are there treated by a solvent, which separates the fatty matters from them. The solvent charged with the grease is delivered to a distilling apparatus $n$, where the grease is separated from the solvent. As to the sludges deprived of grease, they come from the extracting apparatus $n$ to the filter-presses, where they are transformed into cakes.

The extracting apparatus $m$ may be established in any appropriate manner—for example, like that described in my United States Patent No. 636,497. Nevertheless I prefer to employ for this treatment of sludge the system of apparatus which is the subject of my United States Patent No. 671,131.

What I claim as my invention is—

In an apparatus for the purifying of impure waters containing fatty matters, the combination with an elevating-pump for sending the waters into an elevated channel wherein they are to have added to them a suitable reagent and with a series of settling-tanks for the reception of deposits and the decantation of the water, of a filter constituted by a series of tanks $i$ each divided into two compartments by a partition $y$ which extends not quite to their bottoms and separated one from another by walls $S^0$, S', $S^2$, which present in their upper parts grooves T, movable planks H H' of different heights fitted to said grooves to form distribution-gutters, a feeding-channel G between said settling-tanks and filters, an evacuation-channel J for said filters, and gates $G^0$, G' and $J^0$ J' for opening and closing communication between the filters and the said feeding-channel and evacuation-channel respectively, substantially as herein described.

In testimony that I claim the foregoing as my invention I have signed my name, in presence of two witnesses, this 31st day of May, 1900.

JULES DELATTRE.

Witnesses:
ALFRED C. HARRISON,
N. DUNCREE.